Patented Jan. 19, 1937

2,068,056

UNITED STATES PATENT OFFICE 2,068,056

ACID SAFRANINE DYESTUFFS

Eugen Huber and Wolfram Vogt, Leverkusen-I. G.-Werk, Germany, assignors to General Aniline Works, Inc., New York, N. Y., a corporation of Delaware No Drawing. Application January 5, 1934, Serial No. 705,457. In Germany January 14, 1933

4 Claims. (Cl. 260—29)

The present invention relates to new dyestuffs of the safranine series, more particularly it relates to acid safranine dyestuffs which may be represented by the probable general formula:

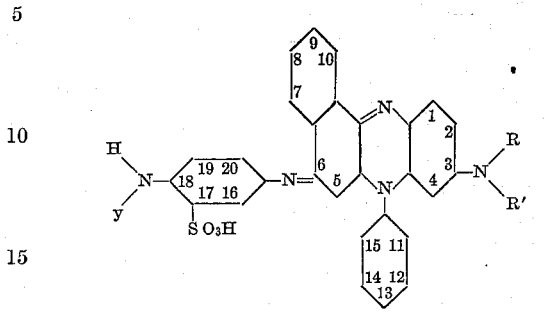

wherein y stands for aryl, aralkyl, alkyl or hydroaryl, such as phenyl, substituted phenyl, benzyl, substituted benzyl, methyl, ethyl, cyclohexyl, R and R' stand for alkyl, aralkyl or aryl, such as methyl, ethyl, benzyl, phenyl, which radicals may bear substituents, and wherein the nuclei may be further substituted, for example, by alkyl, alkoxy, the carboxylic acid group, the sulfonic acid group, halogen and the like.

Our new dyestuffs are obtainable by starting with an isorosinduline-6-sulfonic acid of the general formula:

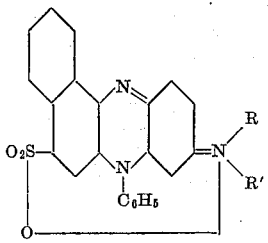

wherein R and R' mean the same as stated above and which may bear further substituents in the nuclei, and condensing with an N-monosubstituted p-phenylenediamine-sulfonic acid of the general formula:

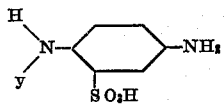

wherein y means the same as stated above, the process being more fully described in the following examples.

Our dyestuffs are further obtainable by starting with an isorosinduline of the general formula:

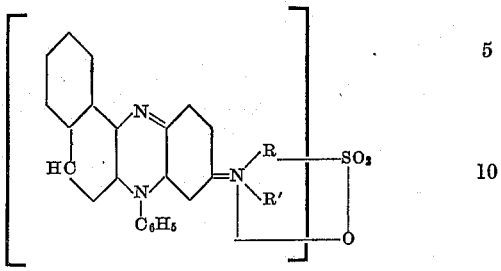

wherein R and R' mean the same as stated above, and condensing with an N-monosubstituted p-phenylenediamine-sulfonic acid of the general formula:

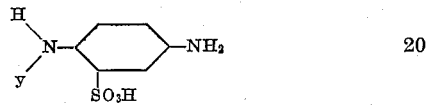

wherein y means the same as stated above, in the presence of an oxidizing agent.

The dyestuffs thus obtainable are in form of their alkali metal salts generally dark, water-soluble powders, dyeing the fibre generally clear blue to greenish-blue shades of good fastness properties.

The invention is illustrated by the following examples, without being limited thereto:

*Example 1.*—The isorosinduline-1.6.13-trisulfonic acid, prepared in the usual manner from 32 grams of the sodium salt of 4-sulfophenyl-β-naphthylamine and 26.5 grams of the sodium salt of 4-aminodiethylaniline-3-sulfonic acid, is heated with 28 grams of the sodium salt of 4-aminodiphenylamine-2-sulfonic acid in an aqueous solution with the addition of 20 grams of crystallized sodium acetate. The dyestuff thus obtained corresponding to the probable formula:

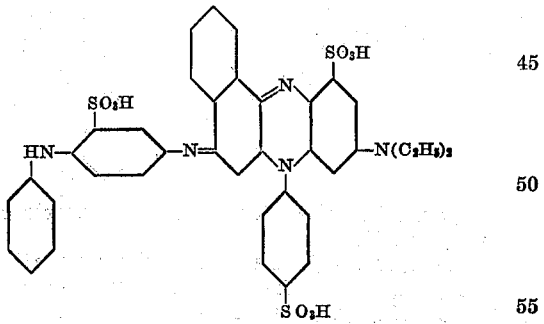

crystallizes on cooling. It is soluble in water with a greenish-blue, in concentrated sulfuric acid with a grass-green coloration and dyes wool clear greenish-blue shades fast to light and washing.

*Example 2.*—The isorosinduline-1.6-disulfonic acid, prepared in the usual manner from 23.5 grams of o-tolyl-β-naphthylamine and 26.5 grams of 4-aminodiethylaniline-3-sodiumsulfonate, is heated as described in Example 1 in aqueous solution or aqueous alcoholic solution with 2'-methoxy-4-aminodiphenylamine-2-sulfonic acid. The dyestuff obtained having in the free state probably the following formula:

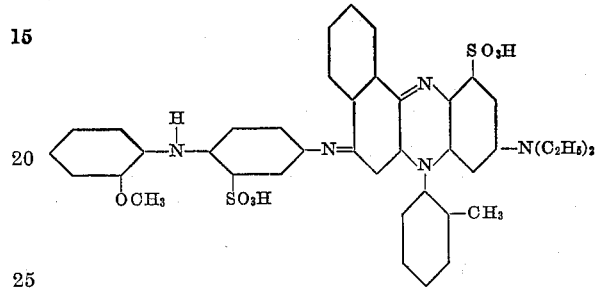

is soluble in concentrated sulfuric acid with grass-green, in hot water with a clear blue coloration and dyes wool clear blue shades of good fastness to light, washing and fulling.

*Example 3.*—The isorosinduline-1.6-disulfonic acid, prepared in the usual manner from 30 grams of 2.5-dichlorophenyl-β-naphthylamine and 26 grams of 4-aminodiethylaniline-3-sodium sulfonate, is caused to react with 2'-methoxy-4-aminodiphenylamine-2-sulfonic acid in aqueous solution as described in Example 1. The dyestuff obtained having in the free state probably the following formula:

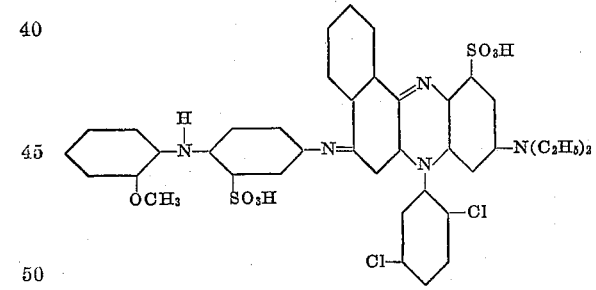

is soluble in concentrated sulfuric acid with a grass-green, in water with a clear greenish-blue coloration. It dyes wool clear greenish-blue even shades fast to light and washing.

The dyestuff having in the free state the following formula:

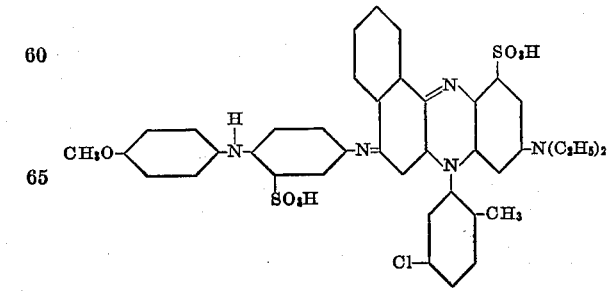

prepared in an analogous manner exerts similar properties.

*Example 4.*—1/10 gram-molecular proportion of the 11-methyl-diethylisorosinduline-1.6-disulfonic acid, prepared in the usual manner, is heated in aqueous solution with the addition of sodium acetate with 1/10 gram-molecular proportion of 4-aminomonomethylaniline-2-sulfonic acid. The dyestuff obtained corresponding in the free state to the following formula:

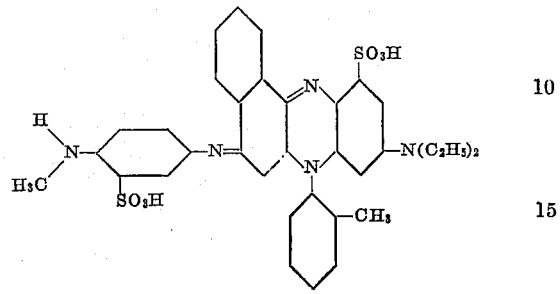

is soluble in concentrated sulfuric acid with a grass-green, in water with a clear blue coloration. It dyes wool clear blue shades of good properties, and compared with the corresponding dyestuff containing the 4-aminodimethylaniline-2-sulfonic acid radical in the 6-position it is distinguished by a highly improved fastness to alkalies.

*Example 5.*—In an analogous manner as described in Example 4 the same isorosindulinesulfonic acid is condensed with 4-aminobenzylaniline-2-sulfonic acid, yielding a dyestuff having in the free state the probable formula:

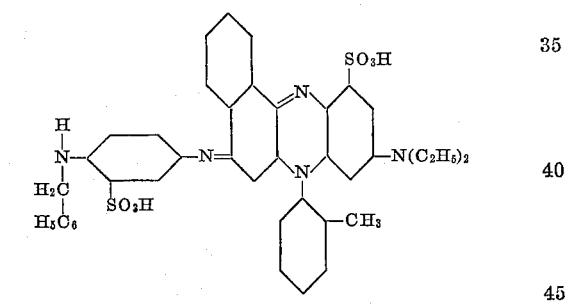

It is soluble in concentrated sulfuric acid with a green, in water with a clear blue coloration and dyes wool clear blue shades. Compared with the corresponding dyestuff containing in the 6-position the radical of 4-aminoethylbenzylaniline-2-sulfonic acid it is distinguished by a remarkable improvement of the fastness to alkalies.

*Example 6.*—The dyestuff having in the free state the probable following formula:

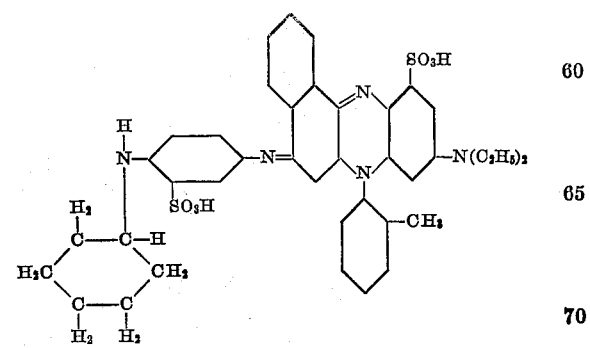

prepared analogously to the process described in Example 4 with the aid of 4-aminocyclohexylaniline-2-sulfonic acid, exerts properties similar to those of the dyestuffs prepared according to Example 5.

Example 7.—The isorosinduline-1.6-disulfonic acid, prepared in the usual manner from 23.5 grams of a-tolyl-β-naphthylamine and 23.8 grams of 4-aminodimethylamine-3-sodiumsulfonate, is heated in aqueous solution or aqueous alcoholic solution with 4'-methoxy-4-aminodiphenylamine-2-sulfonic acid as described in Example 1. The dyestuff obtained corresponding in the free state to the probable formula:

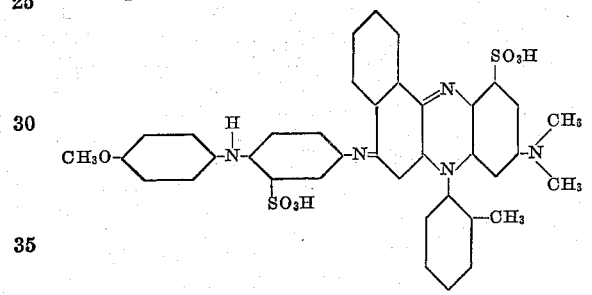

is soluble in concentrated sulfuric acid with a grass-green, in hot water with a blue coloration and dyes wool clear blue shades of good fastness properties.

Example 8.—In an analogous manner as described in Example 7 there is prepared a dyestuff having in the free state the following formula:

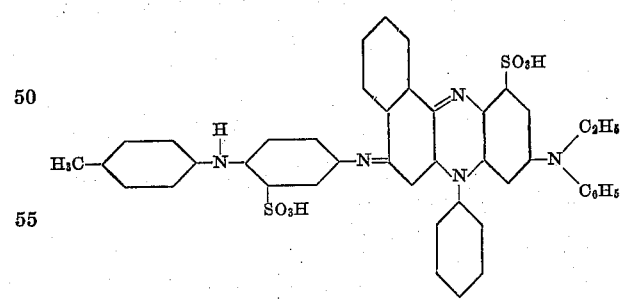

and having similar properties as the dyestuff prepared in accordance with Example 7.

Example 9.—The isorosinduline, prepared in the usual manner from nitrosoethylbenzylaniline-sulfonic acid and phenyl-β-naphthylamine, is transformed in the usual manner into the 6-sulfonic acid by the action of sodium bisulfite; this sulfonic acid is then condensed with 4-aminodiphenylamine-2-sulfonic acid to the safranine of the probable formula:

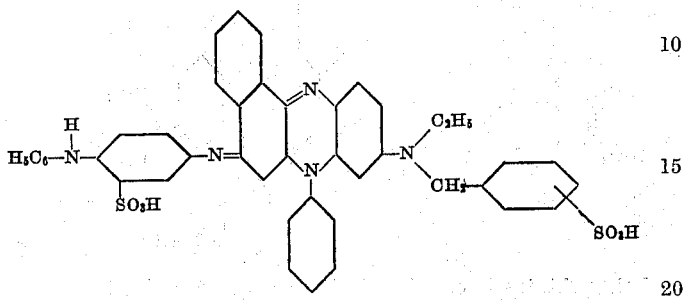

The dyestuff is soluble in concentrated sulfuric acid with a green, in water with a blue coloration and dyes wool reddish-blue shades.

Example 10.—The dyestuff having in the free state the following formula:

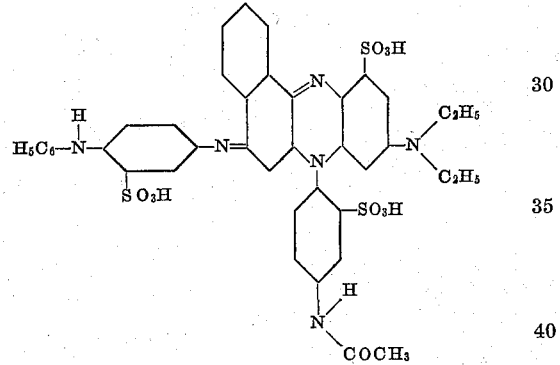

being obtained according to the process described in Example 1, has properties similar to those of the dyestuff prepared in accordance with Example 7.

Example 11.—The dyestuff having in the free state the following formula:

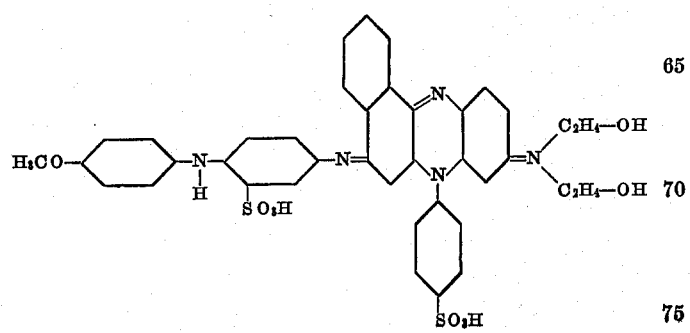

being obtained according to the process described in Example 1, has properties similar to those of the dyestuff prepared in accordance with Example 7.

*Example 12.*—The dyestuff having in the free state the following formula:

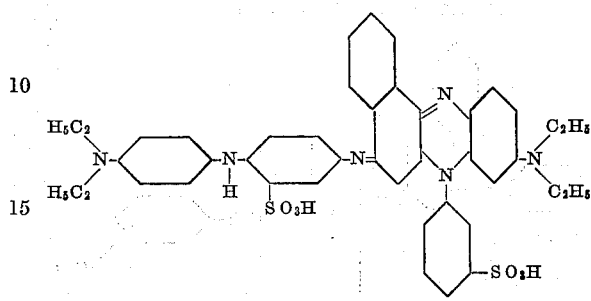

being obtained according to the process described in Example 1, dyes wool greenish-blue shades of good fastness properties.

*Example 13.*—The dyestuff having in the free state the following formula:

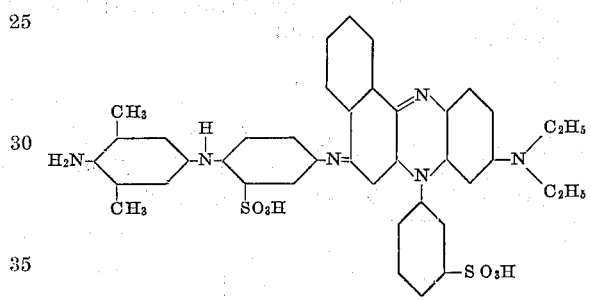

being obtained according to the process described in Example 1, dyes wool greenish-blue shades of good fastness properties.

*Example 14.*—The isorosinduline-sulfonic acid of the formula:

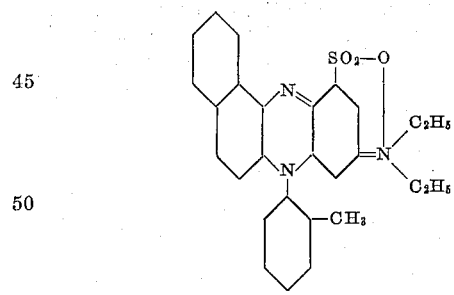

is stirred in aqueous pyridine of 50% strength with 2'-methoxy-4-aminodiphenylamine-2-sulfonic acid and with the addition of nitrobenzene as oxidizing agent and of caustic soda, until a test portion dissolves in concentrated sulfuric acid with a clear green coloration. The dyestuff thus obtained is identical with that described in Example 2.

We claim:

1. Dyestuffs of the safranine series selected from the group of compounds consisting of dyestuffs of the formula

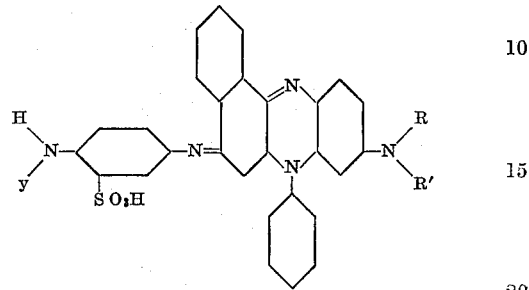

wherein $y$ stands for a radical of the benzene, benzyl, cyclohexyl or alkyl series, R and R' stand for a radical of the benzene, benzyl, or alkyl series, and such compounds substituted by a substituent selected from the group consisting of alkyl, alkoxy, halogen, acetylamino, the carboxylic acid group and the sulphonic acid group, said dyestuffs being in the form of their alkali metal salts generally dark, water-soluble powders, dyeing the fibers generally clear blue to greenish blue shades of good fastness properties.

2. Dyestuffs of the safranine series as defined in claim 1 in which R and R' stand for lower alkyl radicals.

3. Dyestuffs of the safranine series as defined in claim 1 in which R and R' stand for an ethyl radical.

4. The dyestuff having in the free state the following formula:

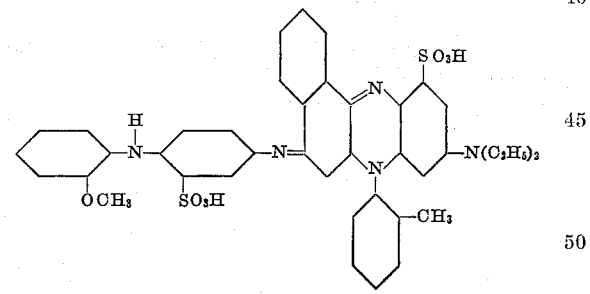

being soluble in concentrated sulfuric acid with grass-green, in hot water with a clear blue coloration and dyeing wool clear blue shades fast to light, washing and fulling.

EUGEN HUBER.
WOLFRAM VOGT.